United States Patent [19]

Orphanos et al.

[11] Patent Number: 5,207,139
[45] Date of Patent: May 4, 1993

[54] ADJUSTING MECHANISM FOR A PIN HEADER CUTTING MACHINE

[75] Inventors: David W. Orphanos, Mohrsville; David A. College, Harrisburg, both of Pa.

[73] Assignee: AMP Incorporated, Harrisburg, Pa.

[21] Appl. No.: 797,499

[22] Filed: Nov. 22, 1991

[51] Int. Cl.⁵ .............................................. B23D 33/02
[52] U.S. Cl. .................................... 83/417; 83/409.1; 83/420; 83/444; 83/449; 83/929
[58] Field of Search ..................... 83/23, 42, 105, 106, 83/167, 268, 282, 375, 409.1, 409.2, 417, 444, 461, 467.1, 468.6, 929, 942, 420, 446, 448, 449

[56] References Cited

U.S. PATENT DOCUMENTS

| 3,799,017 | 3/1974 | Malligan | 83/942 X |
| 4,436,012 | 3/1984 | Hochanadel | 83/409.2 X |
| 4,539,878 | 9/1985 | Linker et al. | 83/409.2 X |
| 4,630,513 | 12/1986 | Keller | 83/409.2 X |

Primary Examiner—Eugenia Jones
Attorney, Agent, or Firm—James M. Trygg; William B. Noll

[57] ABSTRACT

A machine for cutting pin headers of a desired length from lengths of pin header stock is disclosed. A mechanism is provided for adjusting the width of the track opening that receives the pin header stock so that stock of various widths may be accommodated in the machine. A portion of the track is continuously movable, that is, it is never rigidly clamped in a stationary position, but rather, its position relative to a stationary portion may be adjusted by a single control element.

5 Claims, 6 Drawing Sheets

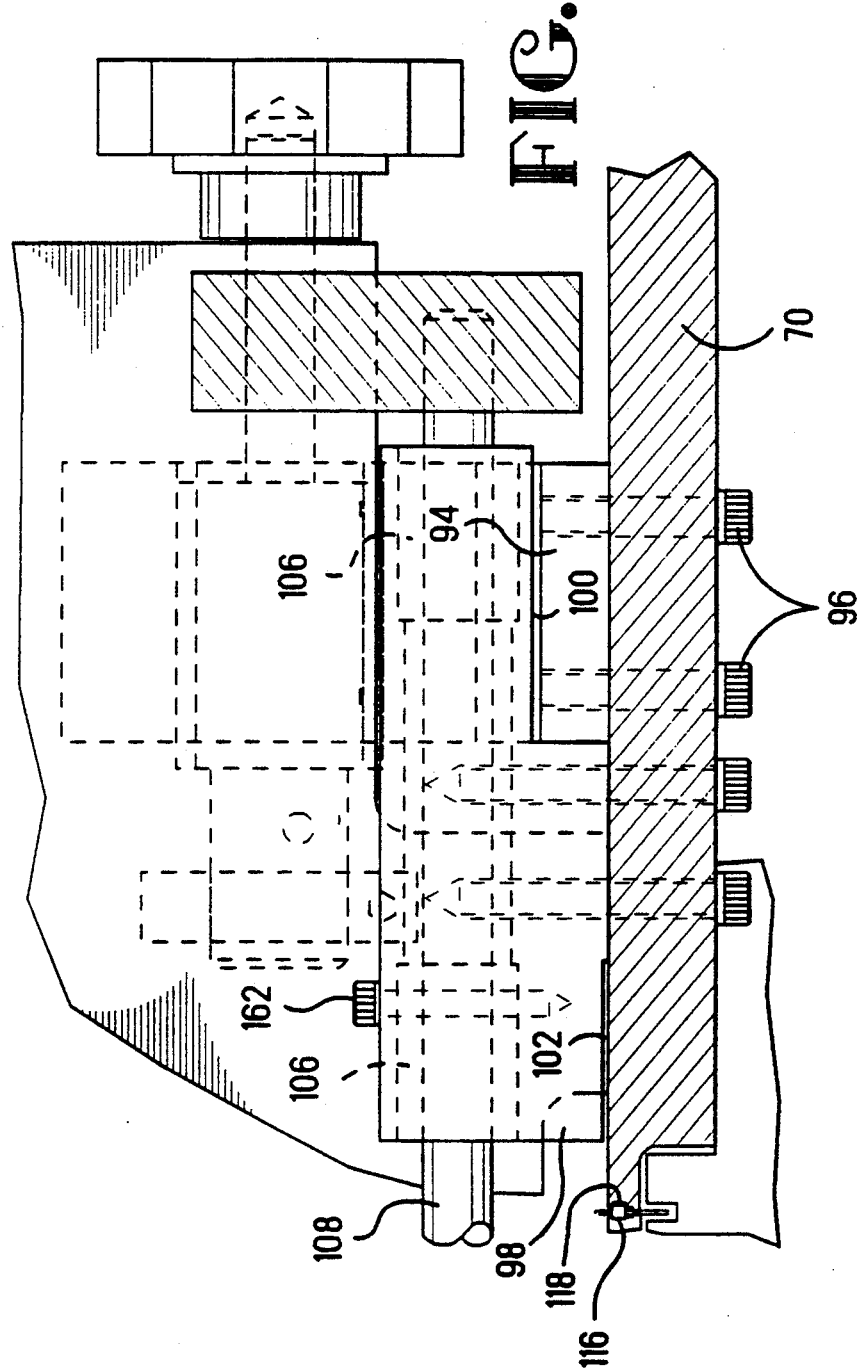

ADJUSTING MECHANISM FOR A PIN HEADER CUTTING MACHINE

This invention relates to apparatus for cutting connector pin headers of specific length from pin header stock.

BACKGROUND OF THE INVENTION

Connector pin headers are primarily used for interconnecting a receptacle connector to metalized circuit traces on a printed circuit board. The pin header includes a relatively long, thin insulating block having a series of pins projecting therethrough on some desired center to center spacing, 0.100 inches for example. The pins are spaced to correspond to plated through holes in the printed circuit board. The pin header is electrically and mechanically attached to the printed circuit board by inserting the shanks or solder tails of the pins of the pin header into the plated through holes until the insulating block engages the surface of the printed circuit board. The shanks of the pins are then soldered to the plated through holes when the other components are soldered to the board. The pins projecting outwardly from the pin header will then mate with a standard receptacle connector made for that purpose. Pin headers may be cut from standard length pin header stock, which may have 40 pin positions along its length and may include single, double, or triple parallel rows of pins.

The machines, available on the market today, for cutting pin headers from pin header stock either shear or saw the insulating block. In all cases the machine is arranged to accommodate the standard length pin header stock. Shearing tools or saw blades are then assembled to an arbor with appropriate spacers therebetween. Spacers and multiple cutters may be assembled to simultaneously cut several pin headers of a desired length. For example, such a machine could be set up to produce five, seven pin position pin headers from every standard length pin header stock with a residual piece left over having five pin positions. With every cycle of the machine the arbor is moved bringing the cutters into engagement with the insulating block thereby cutting the five pin headers. The residual piece is then removed, a new pin header stock inserted, and the machine again cycled. Such machines are complex in nature and require substantial skill and time to set up. Further, the residual piece must be manually removed along with the newly cut pin headers and a new length of pin header stock inserted into the machine, thereby requiring constant operator involvement.

A pin header cutting machine that is relatively easy to set up and which may be loaded with a supply of pin header stock and left to run with minimal operator involvement is described in co-pending application Ser. No. 07/785,384 filed Oct. 30, 1991 and is incorporated herein by reference. This machine, however, lacks the capability of being able to adjust the width of the track so that pin headers of various sizes can be accommodated in the machine.

What is needed is a pin header cutting machine having such an adjustable feature that may be easily and quickly adjusted to accommodate pin header stock of a specific size.

SUMMARY OF THE INVENTION

The present invention involves a machine for cutting a plurality of pin headers each of a specific length from a length of pin header stock. The machine includes a frame having a loading station and a cutting station. A cutting means is provided that is movable into the cutting station for effecting the cutting of the pin header and movable away from the cutting station. A track means is secured to the frame and has a first end at the loading station for receiving the length of pin header stock and guiding it to the cutting station. The track means includes a stationary portion rigidly attached to the frame and a movable portion which is movable between first and second positions with respect to the stationary portion. The track means is arranged so that when the movable portion is in its first position the track means accommodates pin header stock of one size and when in the second position it accommodates pin header stock of a different size. The movable portion of the track means is movable by manipulating only one control.

DESCRIPTION OF THE DRAWINGS

FIG. 6 is a partial cross-sectional view taken along the lines 6—6 in FIG. 3.

DESCRIPTION OF THE PREFERRED EMBODIMENT

Figure 1:
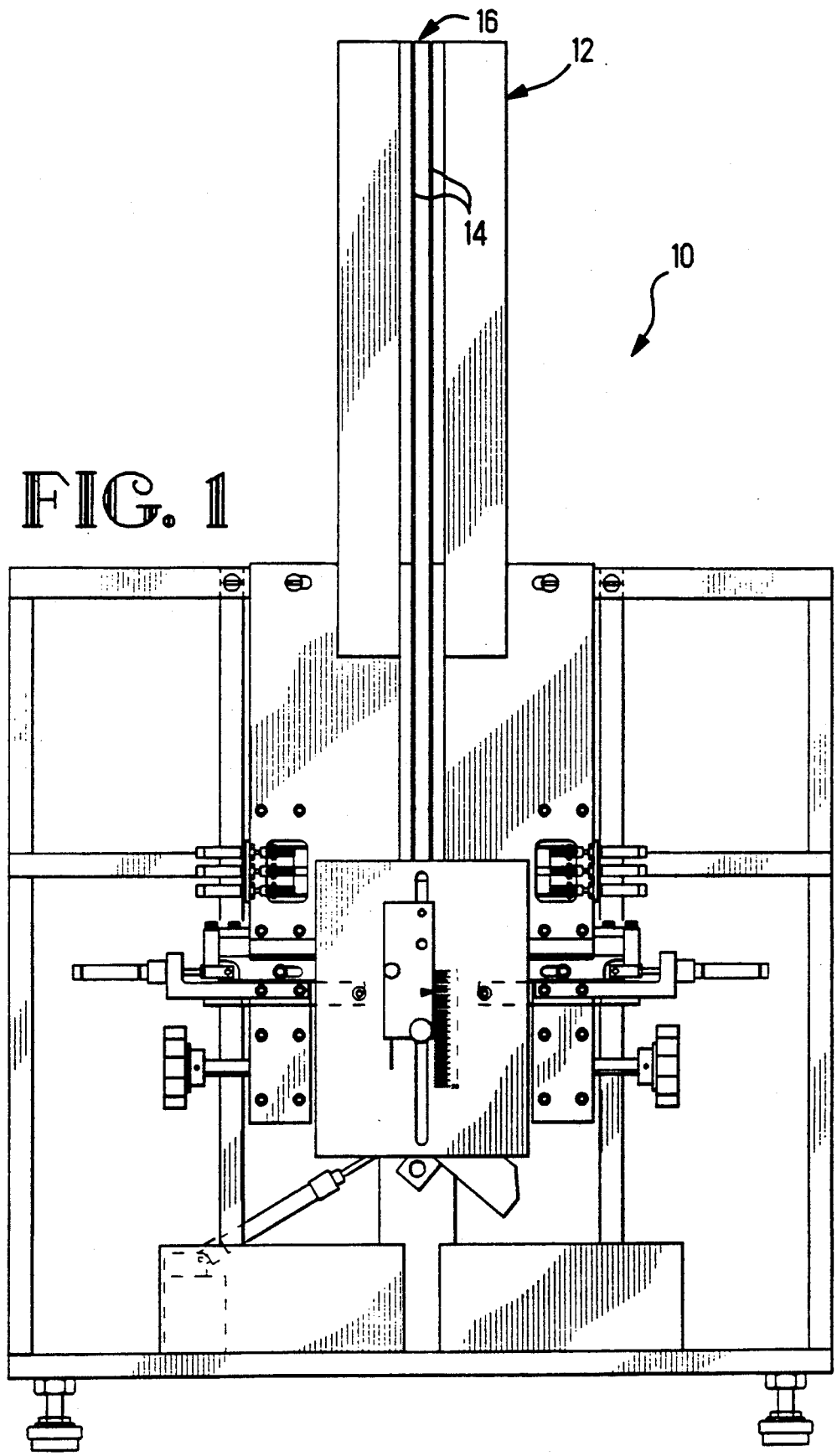
FIG. 1 is a front view of a pin header cutting machine incorporating the teachings of the present invention.
Figure 2:
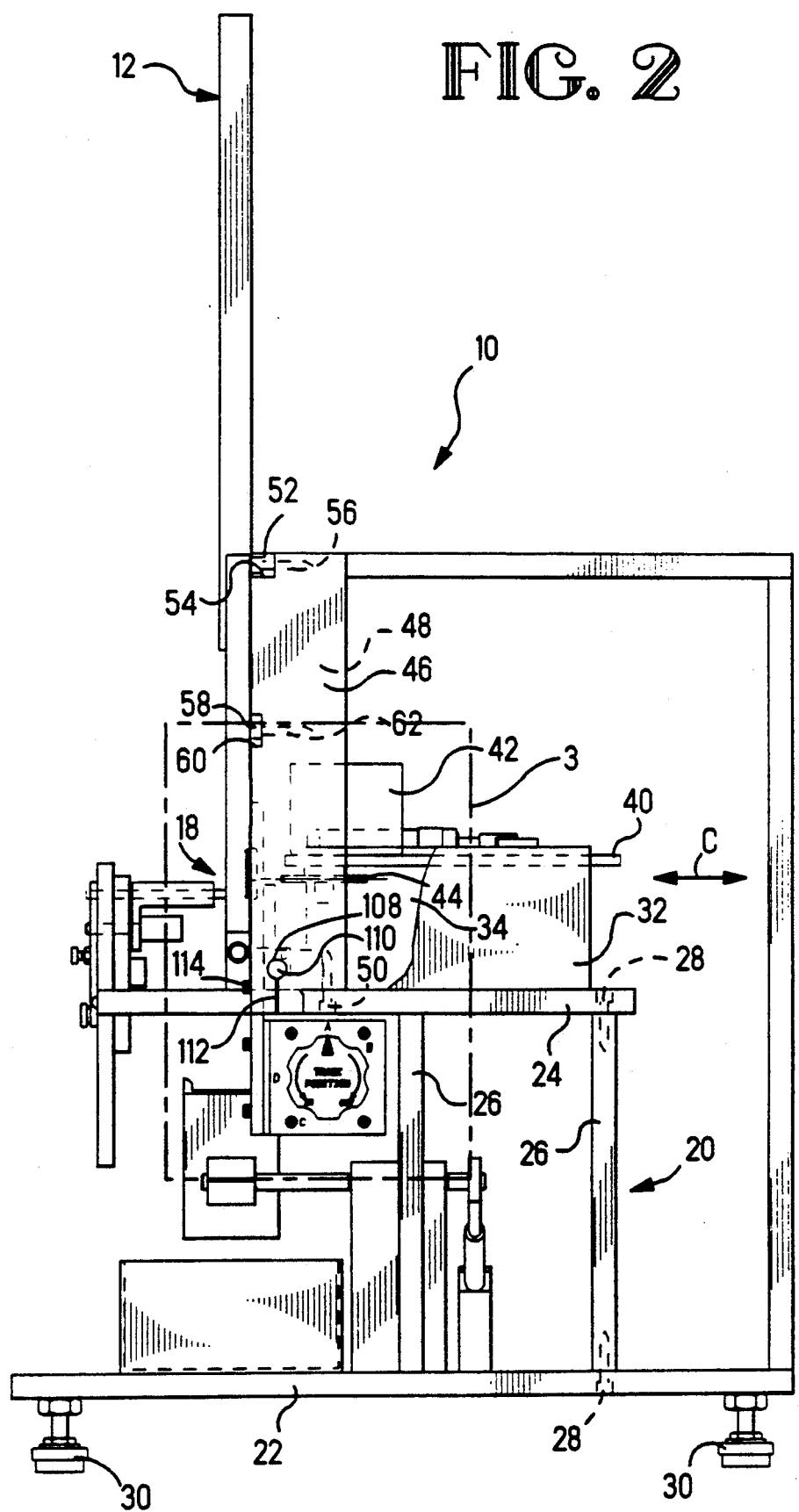
FIG. 2 is a side view of the machine of FIG. 1.
Figure 3:
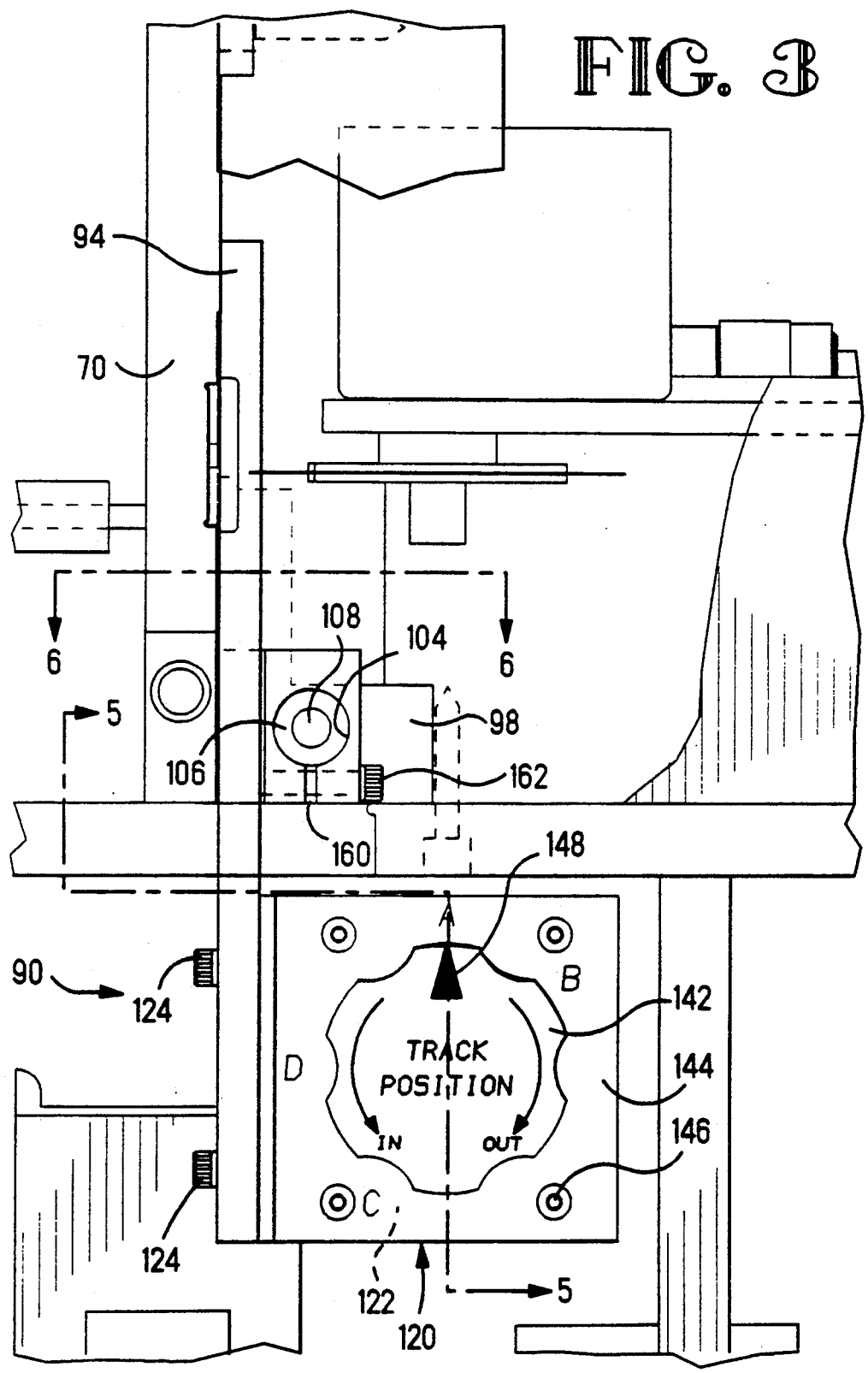
FIG. 3 is an enlarged view of a portion of the machine enclosed in phantom lines and indicated as 3 in FIG. 2.
Figure 4:
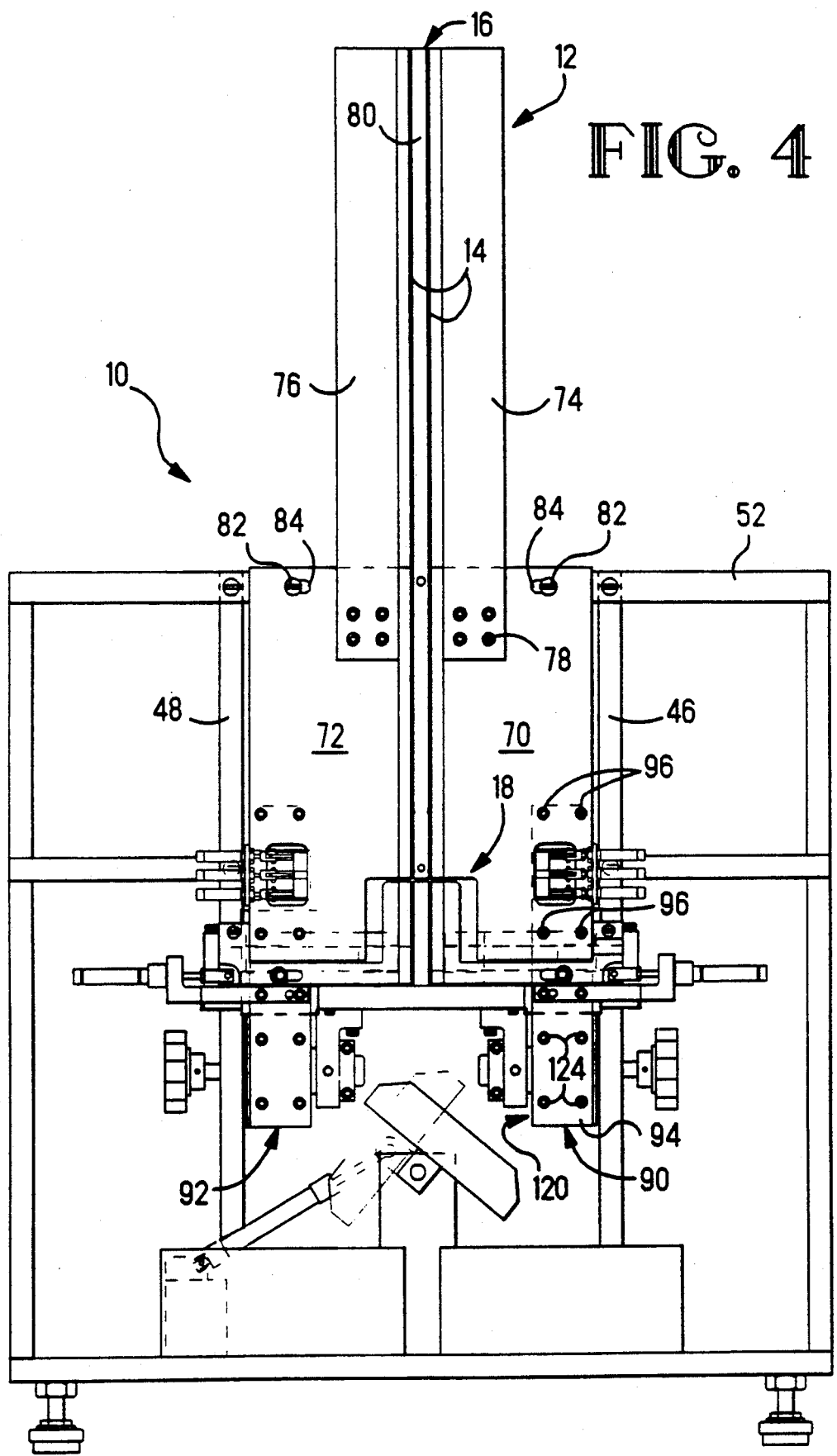
FIG. 4 is a view similar to that of FIG. 1 with a portion of the positioning mechanism removed.

A machine 10 for cutting pin headers from a length of pin header stock is shown in FIGS. 1, 2 and 4. The machine 10 includes a track 12 having a pair of track openings 14 for receiving pin header stock to be cut. The track 12 receives the pin header stock at a loading station 16 and guides the stock to a cutting station 18 where a pin header is cut from the end of the pin header stock. The machine 10 has a frame 20 including a base plate 22, a top plate 24, and four posts 26. The base plate 22 and top plate 24 are rigidly attached to the four posts 26 by means of the screw fasteners 28 which are tightly threaded into the posts 26 to form a rigid frame assembly 20. Four adjustable feet 30 are provided at the four corners of the base plate 22 for leveling purposes in the usual manner. A pair of vertically disposed rectangularly shaped plates 32 and 34 are secured to the top plate 24 by means of the screw fasteners 36. A pair of grooves, not shown, are formed in the opposing surfaces of the rectangular plates 32 and 34 respectively. These opposed grooves form ways for receiving and guiding sliding movement of a slide 40 in the directions of the arrow C, as best seen in FIG. 2. A drive motor 42 is secured to the slide 40 by means of screw fasteners, not shown, and includes a drive shaft projecting downwardly through a clearance hole in the slide 40. A cutting blade 44 is secured to and rotates with this drive shaft directly under the slide 40, as viewed in FIGS. 2 and 3. An air cylinder has its cylinder secured to the rectangular plate 34 and its piston rod coupled to the slide 40. By actuating the air cylinder, the slide 40 can be made to move in the directions indicated by the arrow C so that the blade 44 may enter the cutting station 18 or it may withdraw from the cutting station.

A pair of upright members 46 and 48 are secured to the top plate 24 by means of the screw fasteners 50 as shown in FIG. 2. An upper support bar 52 is disposed transverse to the upright members 46 and 48 within notches 54 formed in the uppermost corners of the members and secured in place with a pair of screws 56 as shown. A lower support bar 58 is disposed within notches 60 formed in the upright members 46 and 48 substantially parallel to the upper support bar 52 and secured in placed with the screws 62.

As shown in FIGS. 1, 2, and 4, the track 12 consisting of right and left track support plates 70 and 72 and right and left track extensions 74 and 76 respectively. The track extensions are rigidly attached to their respective track support plate by means of the screw fasteners 78. A central track member 80, while minimizing lateral play between the parts, is arranged between the two track extensions and track support plates as best seen in FIGS. 1 and 4. A longitudinally disposed groove is formed in each of the two opposite edges of the central track member 80 and a corresponding groove is formed in the opposing surfaces of the two track extensions 74 and 76 and of the track support plates 70 and 72. The two grooves are shaped to be slightly larger than the cross-sectional shape of the insulation block of a length of pin header stock so that the pin header stock will slide freely within the grooves. Additionally, the track support plates 70,72 and the track extensions 74,76 are spaced from the central track member 80 by an amount to allow the pins of the length of pin header stock to freely pass along the entire length of the track 12 and allowed to fall by gravity, within the confines of a pair of grooves 116,118, shown in FIG. 6, toward the cutting station 18.

The track support plates 70 and 72 are attached to the upper support bar 52 with a pair of shoulder screws 82 having a length chosen to permit side to side sliding motion of the support plates within the confines of a pair of elongated holes 84 while minimizing lateral play between the parts. The lower ends of the support plates 70 and 72 are slidingly and adjustably coupled to the frame 20 by means of a pair of couplers 90 and 92. The left most coupler 90, as viewed in FIG. 4, will be described below, it being understood that the other coupler 92 is similar.

Figure 5:
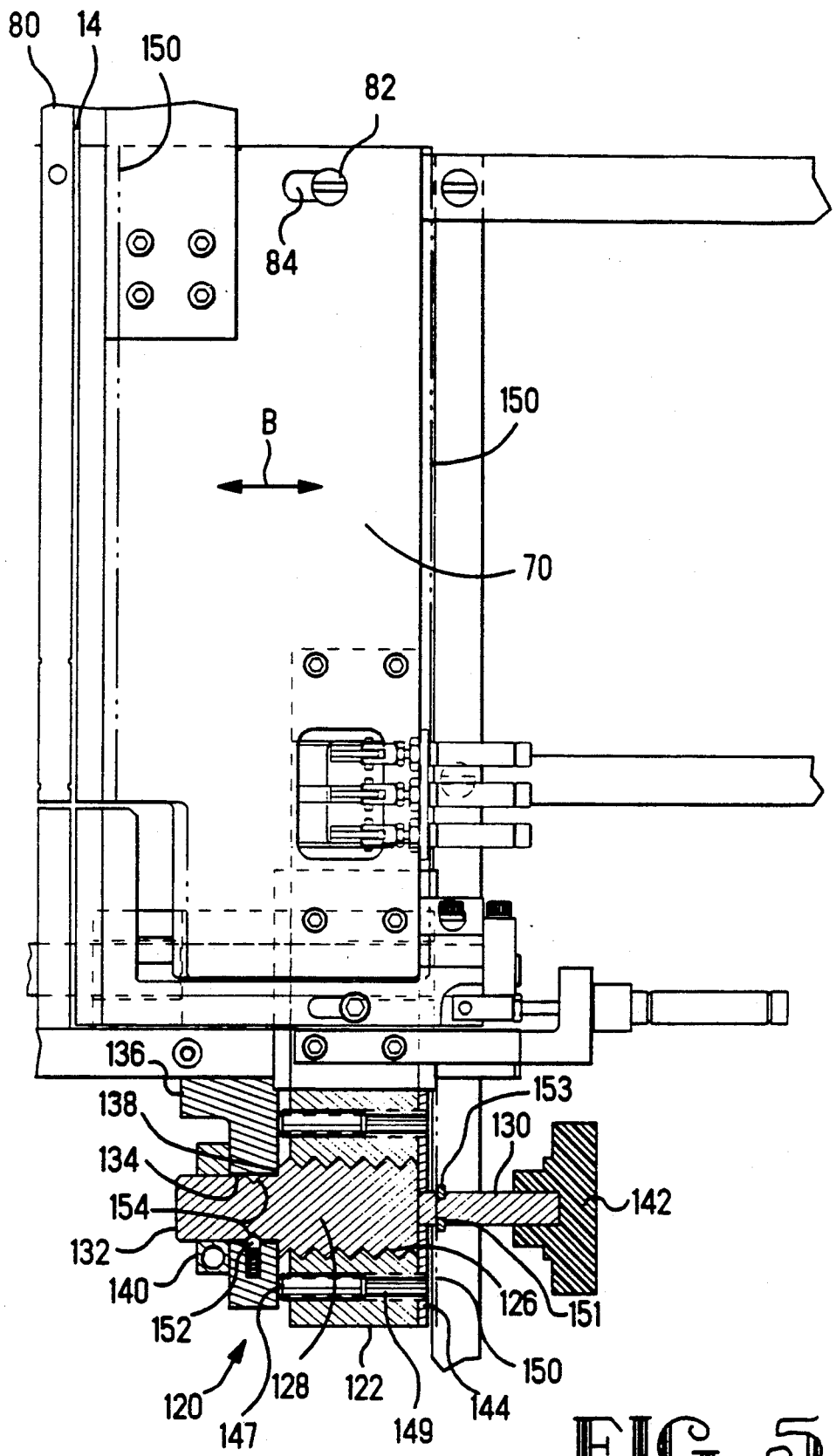
FIG. 5 is a partial cross-sectional view taken along the lines 5—5 in FIG. 3.

The coupler 90, as best seen in FIGS. 3, 5, and 6, includes a back plate 94 which is rigidly attached to the track support plate 70 by means of the screw fasteners 96. A bearing block 98 is attached to the track support plate 70 adjacent the back plate 94 as shown in FIG. 6. Note that a clearance cutout 100 is formed in one end of the bearing block 98 to accommodate the back plate. Another clearance cutout 102 is formed in the other end of the bearing block for a purpose that will be explained below. A hole 104 is disposed through the bearing block 98 and includes a linear ball bearing 106 in each end thereof. A rod 108 is disposed through the bore of the two bearings 106 in sliding engagement therewith and terminates at each end and in holes 110 formed in the upright members 46 and 48. A slot 112 is formed in each upright member 46 and 48 to intersect with the holes 110 as shown in FIG. 2. A screw 114 is tightened into threaded holes formed in the two upright members so that the slots 112 will allow the upright members to rigidly clamp the two ends of the rod 108 thereby holding the rod rigid with respect to the frame 20. With this arrangement, the bearing block 98 is free to slide back and forth along the rod 108 and carry along therewith, the support plate 70 and attached back plate 94. This back and forth sliding movement is effected and controlled by a control unit 120 which is best seen in FIGS. 3 and 5. There are no screws or other fasteners that rigidly clamp the support plate 70 in a stationary position with respect to the central track member 80.

There is shown in FIGS. 3, 4, and 5, the control unit 120 having a housing 122 attached to the back plate 94 by means of the screw fasteners 124. The housing has a central threaded bore 126 containing a mating threaded shaft 128, the thread size in the present example being 1.5-6 UNC. The shaft 128 includes a shank 130 extending axially from one end and an undercut diameter 132 extending axially from the other end. The diameter 132 is disposed within a clearance fit bore 134 in a bracket 136 rigidly attached to the frame 20. The diameter 132 terminates in a shoulder 138 which abuts one side of the bracket 136 while a collar 140 is tightened on the diameter 132 on the other side of the bracket 136 thereby minimizing end play of the shaft 128 while permitting free rotation thereof. A knob 142 is attached to the shank 130 by a set screw or pin in the usual manner, so that the shaft 128 may be rotated by manual manipulation of the knob. By manipulating the knob 142, the shaft 128 may be rotated to cause the housing 122, attached back plate 94, and track support plate 70 to move side to side in the direction of the arrow B. A cover plate 144 is attached to the face of the housing 122 by the screw fasteners 146 as best seen in FIG. 3. The cover plate 144 includes index positions indicated by the letters "A", "B", "C", and "D" formed directly on the plate. The knob 142 includes an arrow 148 for indicating the index position to which the control unit 120, and thereby the track support plate 70, are set. For example, with the arrow 148 pointing to "A" on the cover plate, as shown in FIG. 3, the track support plate 70 is in its most left position toward the central track member 80, as seen in FIG. 5, so that the track opening 14 is set to a minimum value for relatively narrow pin header stock. By rotating the knob 142 clockwise so that the arrow 148 points to the letter "D", the housing 122, back plate 94, and track support plate 70 all move to the right, as viewed in FIG. 5, for a distance of about 0.125 inches to the position shown by the phantom lines 150. In this position the track opening 14 is set to a maximum value for relatively wide pin header stock. It will be understood that any desired amount of travel may be effected by simply selecting an appropriate thread pitch for the threads 126. The amount of travel is limited in one direction by a pair of set screws 147 disposed in threaded holes 149 formed in the housing 122, as best seen in FIG. 5. The set screws 147 are arranged to abut the bracket 136 when the housing 122, back plate 94, and plate 70 are moved left to their maximum extent. The shank 130 includes a groove 151 containing an E-ring 153 which serves to limit travel in the other direction by abutting the cover plate 144 when the housing 122, back plate 94, and plate 70 are moved right to their maximum extent, as best seen in FIG. 5. A travel limiting structure alternate to the E-ring 153 and groove 151 may be an enlarged diameter on the shank 130 which is larger than the diameter of the threads and which abuts either the cover plate 144 or the housing 122. While such an alternate structure is functionally equivalent to the E-ring and groove, it may be more cost effective. A spring loaded detent ball 152 is arranged in the bracket 136 and held in place by a set screw in the usual manner. The diameter 132 includes four indentations 154 in axial alignment with the detent ball 152 and radially spaced to correspond to the radial spacing of the index position indicating letters "A", "B", "C", and "D". This provides a positive feel feedback to the operator that the control 120 is properly set. While four index positions are shown in the present example, any number of positions may be utilized in the practice of the present invention.

A slot 160 is disposed in the bottom of the bearing block 98 for its full length and intersecting the hole 104, as best seen in FIG. 3. A pair of screws 162 are threaded into holes adjacent each of the bearings 106 so that the play between the shaft 108 and each of the bearings 106 can be adjusted and minimized by manipulating one or both of the screws. When doing this, it is possible to slightly distort the bearing block 98. The clearance cutouts 100 and 102 formed in the bearing block isolates this distortion and prevents it from adversely affecting the delicate sliding movement of the track support plate 70 and other sliding mechanisms attached thereto.

An important advantage of the present invention is that the track width of the machine can be easily and quickly adjusted to accommodate a particular size pin header stock. This is accomplished without the need for loosening and retightening attached screws or other securing fasteners. Additionally the bearing block 98 and rod 108 arrangement maintains very accurate alignment of the parts so that parallelism of the movable portion of the track to the stationary portion is held from one index position to another.

We claim:

1. A machine for cutting a plurality of pin headers each of a specific length from a length of pin header stock comprising:
   (a) a frame having a loading station and a cutting station, where said frame includes a projection for receiving a rotatable shaft journaled for rotation within said projection;
   (b) cutting means movable into said cutting station for effecting said cutting of said pin header along a desired cut line and movable away therefrom;
   (c) track means, secured to said frame and having a first end at said loading station, for receiving said pin header stock at said loading station and guiding it to said cutting station;

wherein said track means includes a stationary portion rigidly attached to said frame and a movable portion which is movable between a first position and a second position with respect thereto and arranged so that when said movable portion is in said first position said track means accommodates pin header stock of one size and when in said second position accommodates pin header stock of a different size, said movable portion being movable by manipulation of only a single control comprising said rotatable shaft received in said projection and coupled to said frame and to said movable portion of said track means so that upon rotation of said shaft, said movable portion will undergo movement between said first and second positions, where said shaft includes a threaded portion in threaded engagement with said movable portion, a shoulder in abutting engagement with a surface on one side of said projection and means for maintaining said abutting engagement, said movable portion of said track means includes a threaded bore and said rotatable shaft includes said threaded portion in threaded engagement with said bore, and said means for maintaining said abutting engagement is a collar attached to said rotatable shaft in abutting engagement with a surface on another side of said projection opposite said one side.

2. The machine according to claim 1 including detent means associated with said rotatable shaft and arranged to be operative when said movable portion of said track is in both said first and second positions.

3. The machine according to claim 1 including a rail rigidly attached to said frame and a slide block arranged to slide along and be guided by said rail, said slide block being attached to and carried by said movable portion during movement between said first and second positions.

4. The machine according to claim 3 wherein said rail is a cylindrically shaped rod and said slide block includes a linear bearing attached thereto and in sliding engagement with said rod.

5. The machine according to claim 4 wherein said slide block includes a bore for receiving said linear bearing, a slot in said block intersecting said bore, and a screw disposed in a clearance hole in said block on one side of said slot and in threaded engagement with a threaded hole in said block on the opposite side of said slot so that by adjusting the tension on said screw, lateral play of said linear bearing is thereby adjusted.

* * * * *